United States Patent [19]
Orlandi

[11] Patent Number: 4,941,509
[45] Date of Patent: Jul. 17, 1990

[54] MIXING VALVE FOR HOT AND COLD WATER

[75] Inventor: Alessio Orlandi, Castiglione d/Stiviere, Italy

[73] Assignee: Galatron S.r.l., Castiglione d/Stiviere, Italy

[21] Appl. No.: 396,516

[22] Filed: Aug. 21, 1989

[30] Foreign Application Priority Data

Aug. 22, 1988 [IT] Italy ................................ 5206 A/88

[51] Int. Cl.$^5$ ...................... F16K 11/06; F16K 51/00
[52] U.S. Cl. ................................. 137/625.17; 251/285
[58] Field of Search ................... 137/552, 556, 625.17; 251/285

[56] References Cited

U.S. PATENT DOCUMENTS

| | | | |
|---|---|---|---|
| 3,433,264 | 3/1969 | Parkison | 137/625.17 |
| 3,559,684 | 2/1971 | Rudewick, III | 137/625.17 |
| 3,891,005 | 6/1975 | Manoogian et al. | 251/285 X |
| 3,965,936 | 6/1976 | Lyon | 137/625.17 |
| 4,089,347 | 5/1978 | Christo | 251/285 X |
| 4,375,225 | 3/1983 | Andersson | 251/285 X |
| 4,387,880 | 6/1983 | Saarisalo et al. | 251/285 |
| 4,540,023 | 9/1985 | Pawelzik | 137/625.17 |
| 4,705,072 | 11/1987 | Egli | 251/285 X |

*Primary Examiner*—John Rivell
*Attorney, Agent, or Firm*—McGlew & Tuttle

[57] ABSTRACT

The invention relates to a mixing valve for hot and cold water comprising a cartridge type body, two overlapping disks, one fixed and the other one movable, which interact in opening and closing the water ducts, and a rotating and pivoted control lever to displace and position the movable disk on the fixed one to open or close the water flow. Said control lever is assisted by a slide gate to control the maximum water output by limiting the oscillation of the lever and by a ring designed to adjust the temperature of the mixed water by limiting the rotation of said control lever.

4 Claims, 2 Drawing Sheets

MIXING VALVE FOR HOT AND COLD WATER

FIELD AND BACKGROUND OF THE INVENTION

The present invention relates to mixing valves for hot and cold water in general and in particular to an improved mixing valve for hot and cold water comprising, inside a cartridge type body, two valve means represented by two overlapping disks, made, for instance, of a ceramic material, with separate inlets for hot and cold water and one outlet for the mixed water, one of said disks being fixed to the cartridge type body, while the other one is movable and positionable on top of the fixed disk by means of a control lever capable to oscillate on a transversal axis and to turn around a vertical axis.

Usually the oscillation of the control lever causes the opening and closing of the valve means to let out the water or stop it, while the rotation of said lever in one sense or the other is designed to set the angular position of the movable disk on the fixed one in order to let out either cold or hot water or to mix the two water types at different ratios.

SUMMARY AND OBJECTS OF THE INVENTION

The problem still to be solved as far as this kind of mixing valves are concerned, is the possibility to adjust the maximum water output and to suitably limit the temperature of the mixed water when the valve has been fully opened. Such a possibility appears desirable for a more efficient use of mixing valves by preventing an unnececessary waste of water and in particular of hot water in order to achieve a substantial saving of energy.

It is therefore the scope of the present invention to solve said problem by associating to the mixing valve some simple and economical means allowing to vary and adjust the maximum oscillations of its control lever in order to adjust the water output, as well as to limit the rotation of the same lever at least in one direction so as to adjust the hot water output and thus the maximum temperature of the mixed water, the temperature of the available cold and hot water being known.

To this purpose the present invention relates to a mixing valve for hot and cold water as specified in claim 1, said valve offering the advantage that it can be directly adjusted even by the plumber and without using any special tools, simply basing on the flow and temperature of the available hot and cold water.

BRIEF DESCRIPTION OF THE INVENTION

More details of the invention will however be apparent from the description given hereinafter with reference to the figures of the accompanying drawing in which.

DETAILED DESCRIPTION OF THE PREFERRED EMBODIMENT

Figure 1:
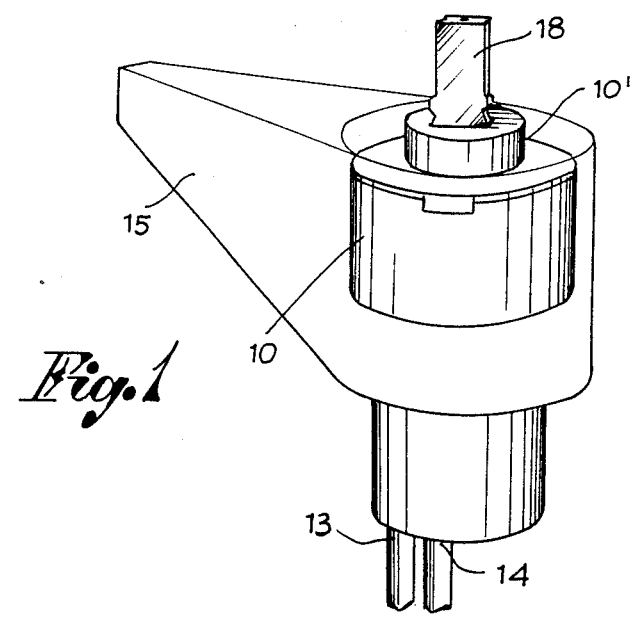
FIG. 1 is a schematical and partly sectional view of a mixing valve fitted inside a tap.
Figure 3:
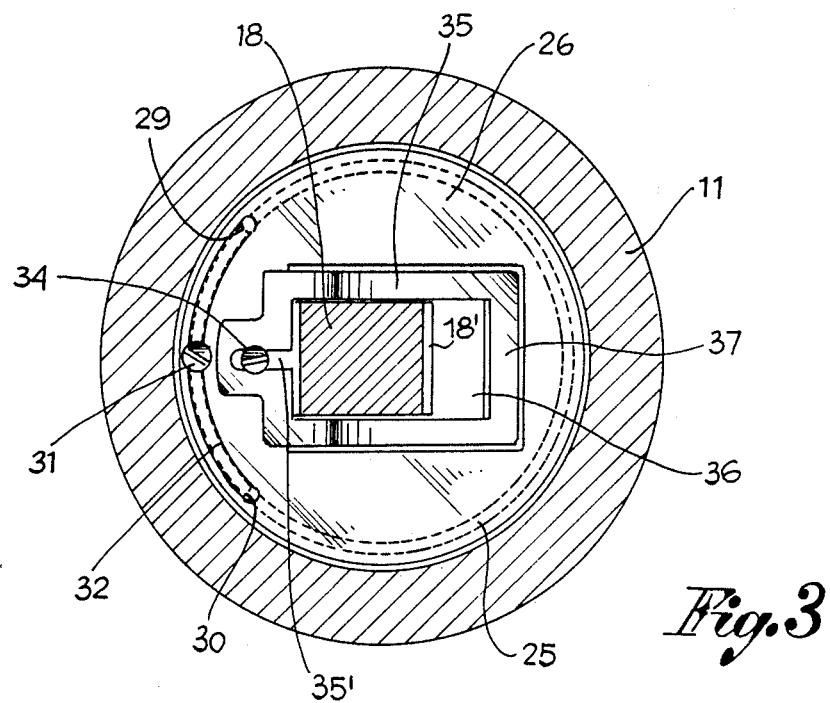
FIG. 3 is a section on the line III—III of FIG. 2.
Figure 2:
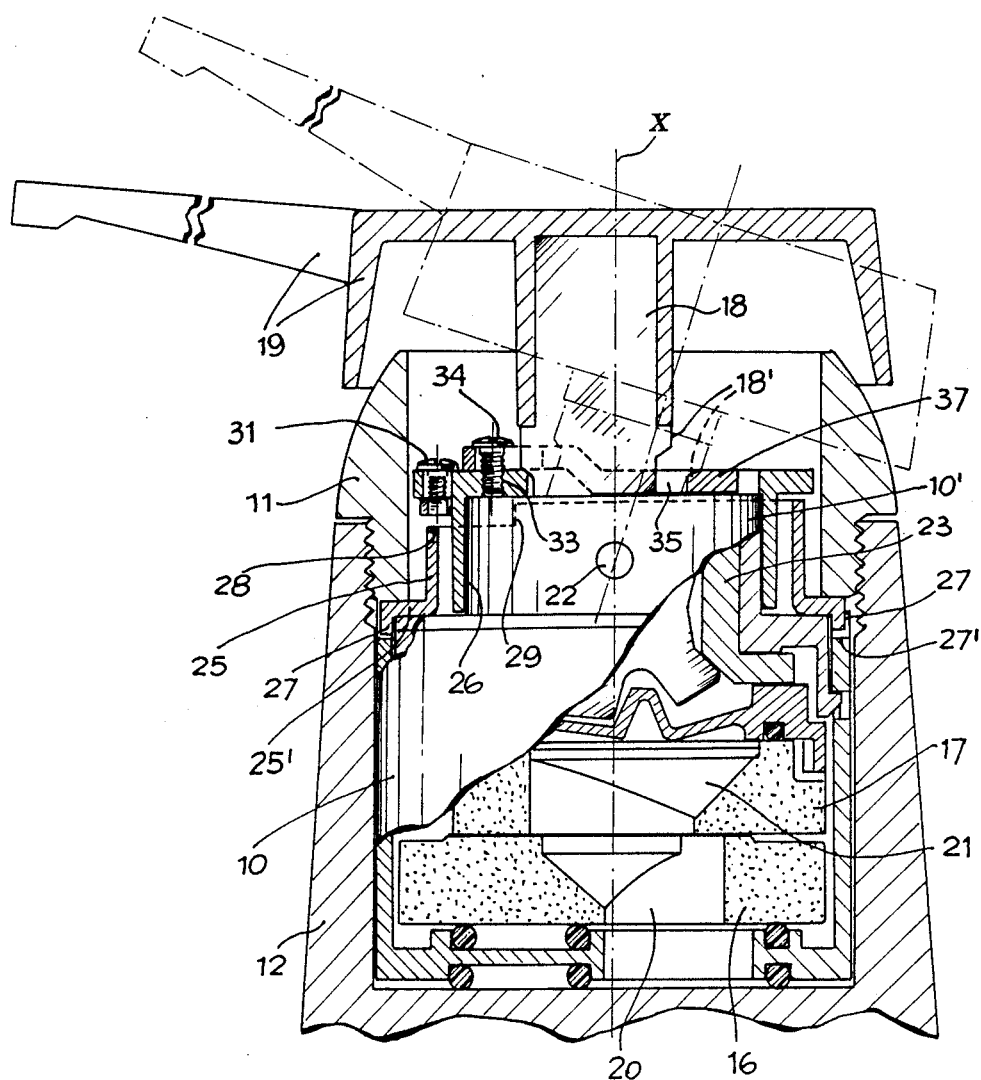
FIG. 2 is a partial section of the cartridge and of the means to adjust the output and temperature of the water cooperating with the control lever.

In said drawing FIG. 1 shows the cartridge type body (10) of the valve fixed by means of a clamping ring (11) into the body of tap (12) enclosing pipes (13, 14) for the separate inlet of hot and cold water and a spout (15) for the outlet of the water to be used.

Inside the cartridge type body the valve elements are mounted, said elements being in particular two overlapping disks of cermaic or other suitable material, the bottom disk (16) being fixed while the top disk (17) can be displaced on the fixed one by means of a control lever (18), the section of which may be square or differently shaped, said lever being fitted with a handle (19). The fixed disk (16) has two (not represented) openings respectively connected with cold and hot water conduits (13, 14) and one opening (20) to let out the cold, hot or mixed water through spout (15) of the tap. The movable disk (17) has in turn a mixing chamber (21) to be placed into different positions towards the openings in the fixed disk in order to control the outflow of the water.

The cartridge type body (10) has a neck (10') on its top and the control lever (18) is assembled, as usual, on a horizontal pin (22) transversally fixed in a supporting bush (23) rotating inside neck (10') of body (10). The control lever (18) may thus swing on the horizontal pin (22) and rotate around a vertical axis (X) coincident with the rotational axis of the supporting bush (23). The swinging of the control lever (18) causes the opening and closing of the mixing valve by displacing the movable disk (17) on the fixed disk (16) while by turning said control lever on its axis (X) the type of water to be delivered by the tap is selected among cold, warm and mixed water as required.

According to the invention, on the neck (10') of the cartridge type body (10) a stationary bush (25) and a setting ring (26) rotating on axis (X) together with the control lever (18) are mounted.

Bush (25) is fitted with a bottom flange (25') fastened on the cartridge type body (10) by means of a clamping ring (11) presenting at least one peripheral tooth (27) to engage a corresponding notch (27') on said body (10) in order to prevent said bush (25) from rotating. In addition, said bush (25) also presents a recess (28) delimiting two shoulders (29, 30) having the purpose to limit the rotation of control lever (18) by means of setting ring (26) and in particular by means of a stop screw (31) is fixed in an arc shaped slot (32) recessed into setting ring (26) and cooperating with shoulders (29, 30) in order to limit the rotation of the lever (18) at least in one sense to vary, for instance, the flow of hot water to be mixed with the cold water and thus adjust the temperature of the water delivered by the tap. Of course, by suitably changing the position of screw (31) along slot (32) it is possible to change at will the temperature of the mixed water delivered when the valve is all open.

The setting ring (26) also presents a hole (33) for a screw (34) to fix a slide gate (35) with an opening (36) shaped according to the section of the control lever (18). A slot (35') in slide gate (35) cooperating with said screw (34) allows to displacement of the slide gate along the diameter of ring (26), while its cross member (37) opposite to slot (35') is cooperating with stop face (18') of control lever (18) when it is moving on pin (22) towards its opening position. Owing to the possibility to position slide gate (35) its cross member (37) can be approached to or moved away from the control lever (18) in order to adjust its oscillation before it contacts cross member (37). Analogously, the maximum opening of the mixing valve can be adjusted in order to control the quantity of water delivered when the valve is all open.

Finally it is pointed out that both the setting ring (26) and the slide gate (35) can be coupled to scales or any other means showing the flow rate and temperature of the water to be deliverd once the mixing valve has been fully opened.

I claim:

1. A mixing valve for hot and cold water comprising: a cartridge body defining a valve space; hot and cold water outlet openings connected to said valve space; a first valve disk fixed in said cartridge body valve space and a second valve disk displaceably positioned within said valve space; a control lever for displacing said second valve disk, said cartridge body having a vertical axis, said control lever swinging about an axis transverse to said vertical axis; clamping ring means for fixing said cartridge body into a tap; temperature setting means connected to said control lever for limiting rotation of said control lever around the vertical axis, said temperature control means including a bush having angularly spaced shoulders, said bush being fixed to said cartridge body, a setting ring disposed concentric to said bush and connected to said control lever for rotation with said control lever, a stop screw fitted to said setting ring for cooperation with said shoulders to limit the rotation of said lever, said stop screw being fixed inside an arc-shaped slot recessed in said setting ring; and, volume rate of flow limiting means connected to said lever for limiting the movement of said lever about said transverse axis to limit the volume rate of flow of water, said volume rate of flow limiting means including a slide gate positioned on said setting ring, said slide gate including an opening, said control lever passing through said opening of said slide gate, a cross member connected to said slide gate, said slide gate and said cross member being displaceable with respect to said slide ring and said control lever, said slide gate including a slot, a screw positioned in said slot and fixable relative to said setting ring for fixing said slide gate and said cross member relative to said setting ring to limit the movement of said control lever about said transverse axis.

2. A mixing valve according to claim 1, wherein said bush is fixed on said cartridge body by means of a clamping ring, said bush being fitted with a tooth engaging a notch provided on said cartridge body.

3. A mixing valve according to claim 1, wherein said slide gate is rotatable with said control lever, said setting ring and said slide gate being connected for rotation with said control lever about said vertical axis.

4. A mixing valve according to claim 1, wherein said bush and said setting ring are concentric and flush with a neck portion provided on an upper side of said cartridge body.

* * * * *